(12) United States Patent
Hall et al.

(10) Patent No.: US 10,112,652 B2
(45) Date of Patent: Oct. 30, 2018

(54) THREE-WHEELED VEHICLE CRUMPLE ZONE

(71) Applicants: David R. Hall, Provo, UT (US); Stephen R. Hall, Draper, UT (US); Christopher Johnson, Provo, UT (US); Jedediah Knight, Provo, UT (US)

(72) Inventors: David R. Hall, Provo, UT (US); Stephen R. Hall, Draper, UT (US); Christopher Johnson, Provo, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 36 days.

(21) Appl. No.: 15/369,034

(22) Filed: Dec. 5, 2016

(65) Prior Publication Data
US 2018/0154942 A1    Jun. 7, 2018

(51) Int. Cl.
*B60N 99/00*    (2006.01)
*B62D 21/15*    (2006.01)
*B62D 21/11*    (2006.01)

(52) U.S. Cl.
CPC ............ *B62D 21/152* (2013.01); *B62D 21/11* (2013.01)

(58) Field of Classification Search
CPC ................................ B62D 21/152; B62D 21/11
See application file for complete search history.

(56) References Cited

U.S. PATENT DOCUMENTS

| | | | | |
|---|---|---|---|---|
| 4,020,914 A * | 5/1977 | Trautwein | ............ | B60G 21/007 180/15 |
| 9,221,508 B1 * | 12/2015 | de Haan | .................. | B60N 2/90 |
| 9,708,005 B2 * | 7/2017 | Reusser | ................ | B62D 21/11 |
| 2009/0108555 A1 * | 4/2009 | Wilcox | .................. | B60G 7/008 280/93.51 |
| 2012/0181765 A1 * | 7/2012 | Hill | ........................ | B62K 5/027 280/62 |
| 2012/0241237 A1 * | 9/2012 | Holroyd | .................. | B62K 5/05 180/210 |
| 2013/0105238 A1 * | 5/2013 | Hall | ........................ | B60G 3/20 180/210 |
| 2013/0119629 A1 * | 5/2013 | Lee | ........................ | B60G 3/00 280/124.117 |
| 2013/0341113 A1 * | 12/2013 | Mullin | .................. | B62K 5/027 180/264 |
| 2014/0238758 A1 * | 8/2014 | Barth | ...................... | B60K 6/48 180/65.25 |
| 2014/0262578 A1 * | 9/2014 | Calley | ................. | B62D 61/065 180/210 |
| 2015/0114740 A1 * | 4/2015 | Hall | ........................ | F16H 3/22 180/210 |
| 2017/0073008 A1 * | 3/2017 | Padhye | ................. | B62D 39/00 |
| 2017/0334259 A1 * | 11/2017 | Hall | ........................ | B60G 3/06 |

* cited by examiner

*Primary Examiner* — Lori L Lyjak

(57) ABSTRACT

A three-wheeled vehicle crumple zone is described. The crumple zone includes a triangular, single-sided swing arm coupling a wheel to a frame of the vehicle at an end-most portion of the vehicle. The swing arm includes a u-shaped frame yoke coupling the swing arm to the frame and an angled wheel yoke coupling the wheel to the swing arm. The wheel yoke extends from the frame yoke at an angle ranging from 40 to 70 degrees, such that the frame yoke, the wheel yoke, and a centerline axis extending perpendicularly from the frame yoke form a right triangle.

20 Claims, 20 Drawing Sheets

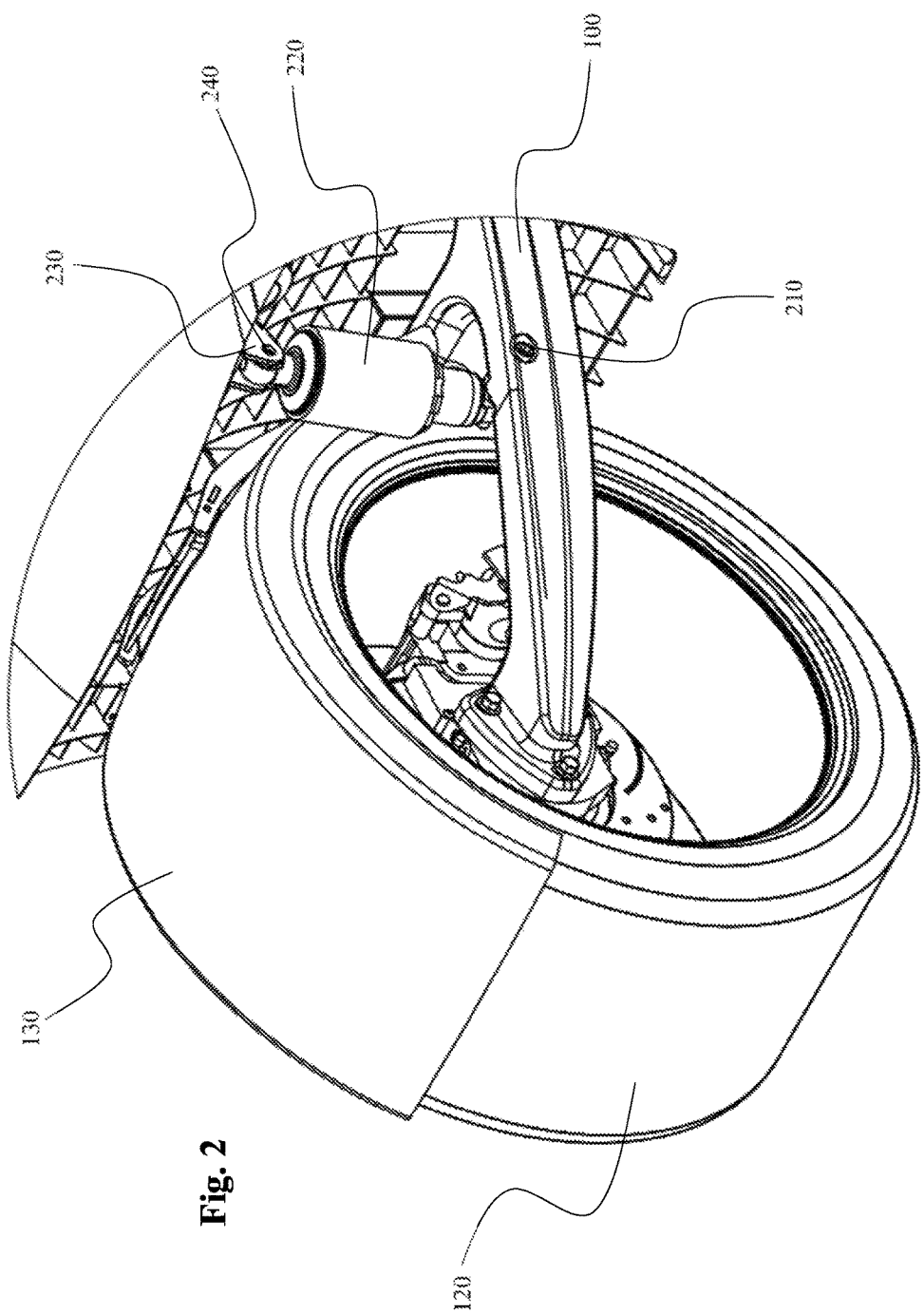

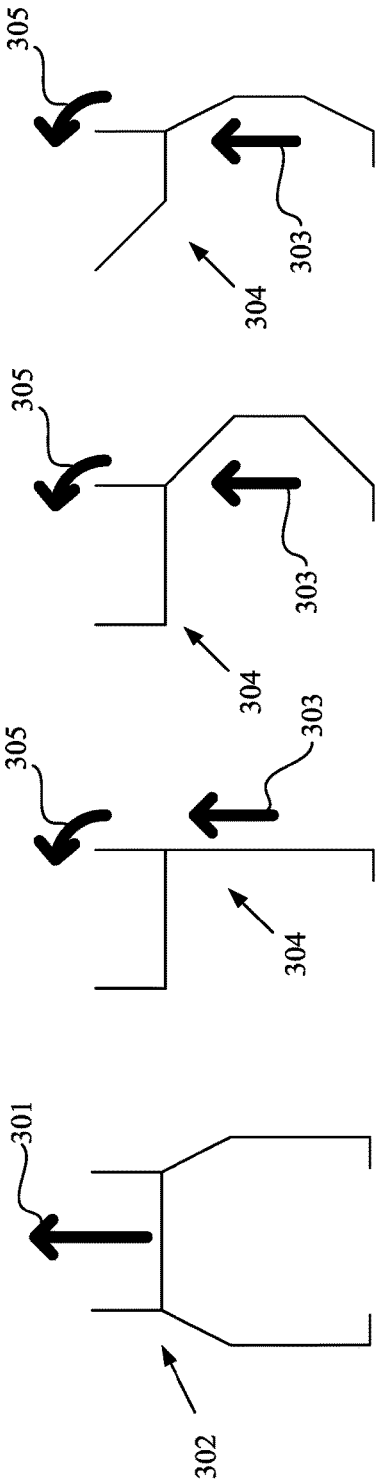
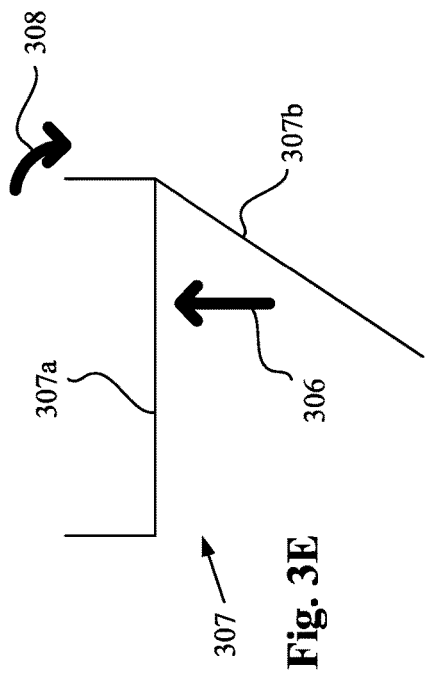

THREE-WHEELED VEHICLE CRUMPLE ZONE

FIELD OF THE INVENTION

This invention relates to apparatuses used to pivotally fix a single vehicle wheel to a vehicle frame.

BACKGROUND OF THE INVENTION

Swing arms are typically used on vehicles where a single wheel, as opposed to two wheels connected by an axle, is fixed to a vehicle frame. Swing arms are especially common in motorcycle design, where one or both wheels are attached to the vehicle frame through a swing arm. The primary purpose of such a swing arm is to provide a strong structural connection of the wheel to the vehicle frame while withstanding significant forces imposed by movement of the vehicle and loads carried by the vehicle. Furthermore, many swing arms have the additional purpose of providing a structure through which a wheel's non-rotational movement can be decelerated and dampened by means of a suspension system, thus imposing smaller stresses on vehicle frame members and increasing passenger comfort.

In the case of a motorcycle, a swing arm may be used at the rear side of the vehicle to pivotally fix and suspend a driven wheel. Often the wheel is driven by a system of gears and sprockets connected with a driving belt or chain. In such an application, the swing arm's design is affected considerably by the need to incorporate driving components and the need to account for the dynamics of driving a suspended, load-bearing wheel. The swing arm may attach to one or two sides of the wheel's rotational axis in order to pivotally fix the wheel to the vehicle frame.

Three-wheeled vehicles are gaining popularity as their unique aesthetics and design become more widely recognized. A three-wheeled vehicle usually requires a swing arm based on the fact that at least one of the three wheels it utilizes must be at the rear of the vehicle while the other two balance the vehicle by being at the front (or vice versa). However, it is advantageous to drive the pair of two wheels rather than the single wheel for the benefit of increased traction and proximity to the engine. Since three-wheeled designs are uncommon, a swing arm design and manufacturing procedure must also accommodate low production quantities and costs while maintaining tight tolerances.

The majority of swing arms in the art are used on vehicles which drive the single wheel attached to the swing arm using a driving belt or chain. In addition, swing arms do not commonly have inherent features (rather than external ones) which accommodate and protect wheel assembly components (wires, brake lines, etc.) which must traverse the distance between the vehicle frame and the wheel assembly fixed to the swing arm. Furthermore, even minor collisions with current swing arms cause sometimes irreparable damage to the vehicle frame. Thus there is room for improvement to swing arms.

SUMMARY

This invention has been developed in response to the present state of the art and, in particular, in response to the problems and needs in the art that have not yet been fully solved by a currently available apparatus. Accordingly, an improved apparatus has been developed to pivotally fix a non-drive wheel to a vehicle frame. Features and advantages of different embodiments of the invention will become more fully apparent from the following description and appended claims, or may be learned by implementation of the invention as set forth hereinafter.

Consistent with the foregoing, a swing arm is disclosed. A particular implementation of the swing arm on a reverse-trike roadster is disclosed. Different geometries used to interface portions of the swing arm with a separate mounting plate are disclosed. Additional features such as vehicle frame member interfaces, suspension system interfaces, and structural supports are disclosed. A trough and several embodiments thereof are disclosed. Methods of manufacturing the swing arm are also disclosed herein.

In one embodiment of the present invention, a three-wheeled vehicle crumple zone is described. The crumple zone includes a triangular, single-sided swing arm coupling a wheel to a frame of the vehicle at an end-most portion of the vehicle. The swing arm includes a u-shaped frame yoke coupling the swing arm to the frame and an angled wheel yoke coupling the wheel to the swing arm. The wheel yoke extends from the frame yoke at an angle ranging from 40 to 70 degrees, such that the frame yoke, the wheel yoke, and a centerline axis extending perpendicularly from the frame yoke form a right triangle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2 is a close-up view of the rear wheel of the vehicle shown in FIGS. 1A-B;

FIGS. 3A-E depict a comparison of various swing arm designs;

DETAILED DESCRIPTION

Figure 1A:
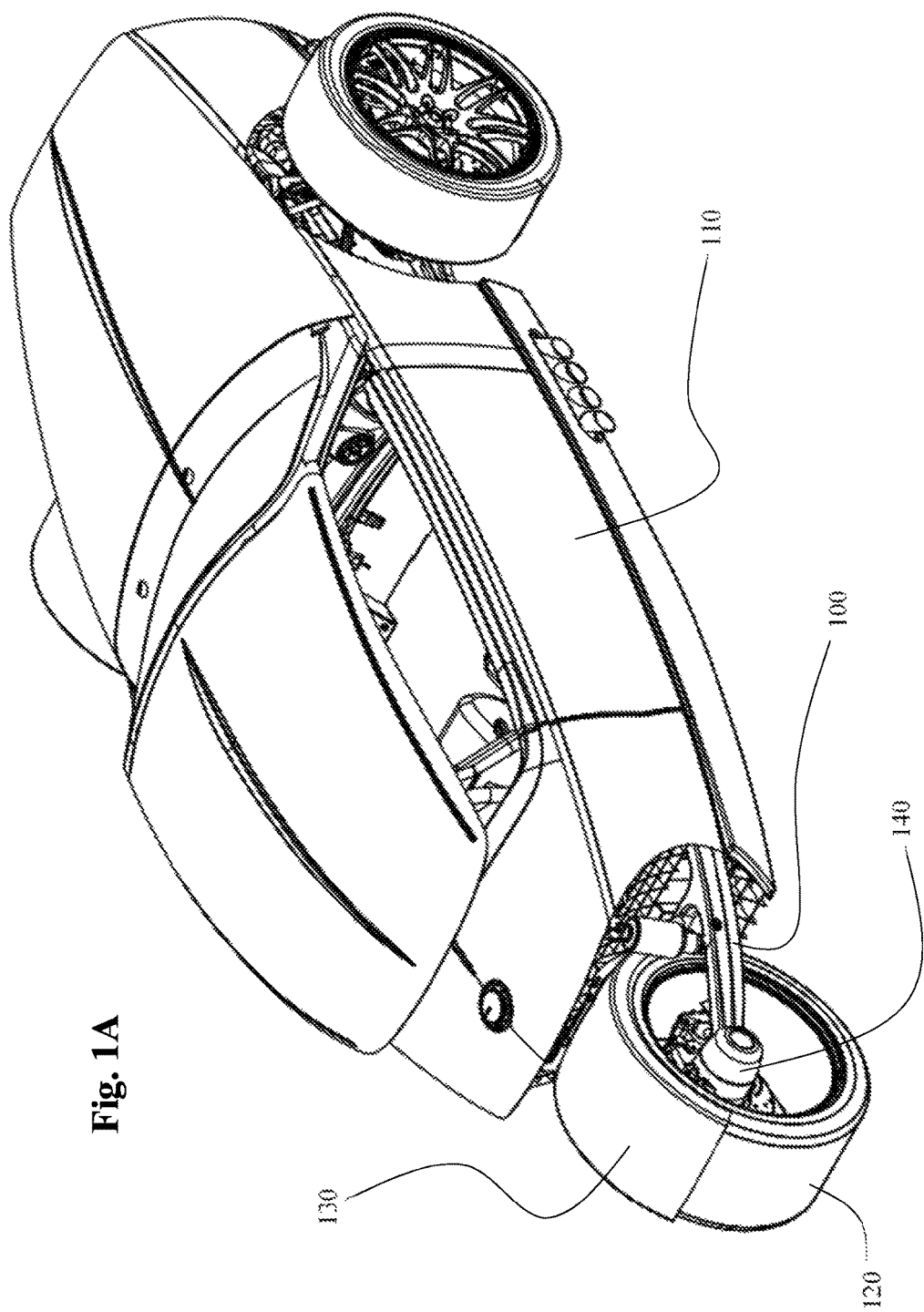
FIGS. 1A-B are perspective views of a reverse trike vehicle utilizing the present invention at the rear side of the vehicle with an assembly cover.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Generally, the Figures described below depict various embodiments of a swing arm, including embodiments in accordance with the claimed invention. A significant limitation of previous swing arm designs is the vulnerability of the vehicle to collisions, especially direct collisions, with the swing arm. In many cases, a collision with swing arms of previous designs results in bending of the frame which, in many cases, renders the vehicle unsalvageable, or at least so damaged as to require a "salvaged" title. FIG. 3 depicts such vulnerability in more detail. One object of the present invention is to reduce the risk of damage to the vehicle frame by creating a "crumple zone" of the swing arm that absorbs energy from a collision and/or more efficiently distributes forces from a collision to the frame.

In one embodiment of the claimed invention, a three-wheeled crumple zone is described that includes a triangular, single-sided swing arm. The swing arm couples a wheel to a frame of the vehicle at an end-most portion of the vehicle. The swing arm includes a U-shaped frame yoke coupling the swing arm to the frame, and an angled wheel yoke coupling the wheel to the swing arm. The wheel yoke extends from the frame yoke at an angle ranging from 40 to 70 degrees, such that the frame yoke, the wheel yoke, and a centerline axis extending perpendicularly from the frame yoke form a right triangle. The angle is such that a collision force required to reduce the angle is less than a force required to bend the frame where the frame yoke couples to the frame. In various embodiments, the angle ranges from 45 degrees to 65 degrees or 50 degrees to 60 degrees. In one particular embodiment, the angle is 55 degrees plus or minus one degree.

In various embodiments of the claimed invention, the frame yoke includes a base, a first arm, and a second arm. The first arm and the second arm are coupled to the frame and extend perpendicularly from the base at opposite ends of the base from each other.

In some embodiments of the claimed invention, the wheel yoke includes a C-beam structure having a top flange, a bottom flange, and a web extending from the top flange to the bottom flange. The top and bottom flanges and the web extend along a length of the wheel yoke away from the frame yoke. In some such embodiments, the frame yoke also includes a C-beam structure having a top flange, a bottom flange, and a web extending from the frame yoke top flange to the frame yoke bottom flange. In one embodiment, the frame yoke C-beam and the wheel yoke C-beam form an intersection between the frame yoke and the wheel yoke. In the same or other embodiments, the wheel yoke web is perforated along a length extending from the wheel yoke top flange to the wheel yoke bottom flange. Alternatively, in the same or other embodiments, the wheel yoke web includes a first thickness and a second thickness. The first and the second thicknesses alternate along a length of the wheel yoke when extending from the wheel yoke top flange to the wheel yoke bottom flange. In some embodiments, the top flange, the bottom flange, and the web extend along an entire length of the wheel yoke.

A particular benefit of the C-beam structure is that such a structure has high flexural strength along a vertical axis, but weaker flexural strength along a horizontal axis. Thus, the swing arm has high strength along the vertical axis where it is most needed, but crumples in collisions, dissipating much of the force of a collision and protecting the vehicle frame. Generally, in various embodiments, a force required to reduce the angle between the wheel yoke and the frame yoke is less than a force required to deform the frame at the point where the frame yoke couples to the frame. In one such example, the angle between the wheel yoke and the frame yoke has a "V" shape. In some embodiments, a curved flange is added between the wheel yoke and the frame yoke having a radius ranging from one-twentieth a length of the wheel yoke to equal to the length of the wheel yoke. This increases the amount of energy absorbed by the swing arm during a collision significantly using only slightly more material, and only slightly increasing the force transmitted to the frame.

In some embodiments of the claimed invention, a vehicle bumper is coupled to the wheel yoke. For example, in some embodiments, the bumper extends from the wheel yoke at an angle equal to the angle formed by the wheel yoke and the frame yoke, and extends around a portion of the wheel on a side of the wheel opposite the frame yoke. This structure creates a secondary crumple zone on the swing arm that absorbs additional force from a collision.

Referring to FIG. 1A, a perspective view of one application of one embodiment of the present invention is shown. A swing arm 100 is shown which pivotally fixes a rear wheel 120 to a three-wheeled vehicle body 110. The three-wheeled vehicle is shown in its completely assembled state, which includes a wheel guard 130 over the rear wheel 120 and housing 140 which covers and protects components at the interface between the swing arm 100 and other components which are obstructed in this view.

Figure 1B:
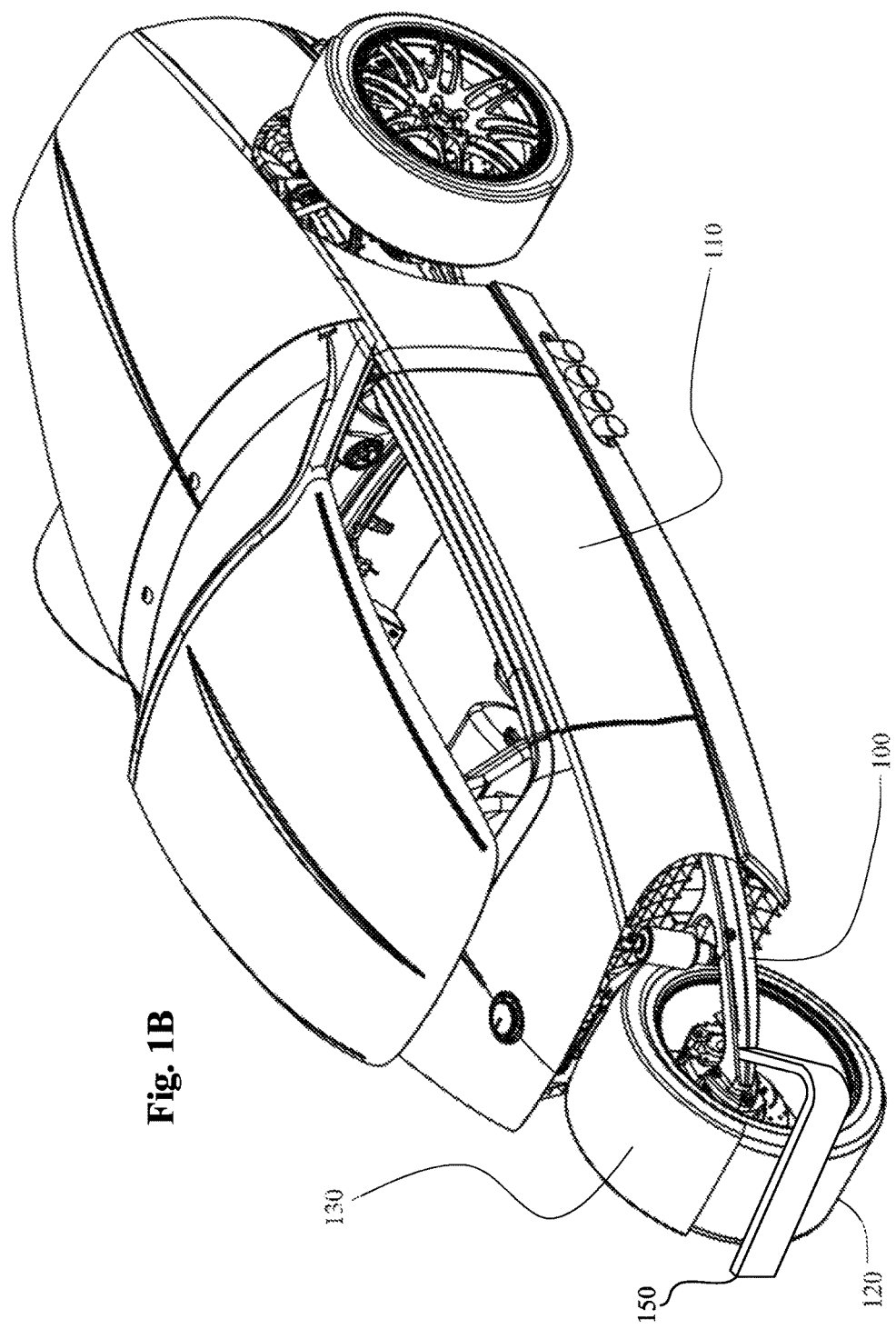

FIG. 1B shows the same perspective view as FIG. 1A showing the same application and embodiment of the present invention as FIG. 1A. The swing arm 100 is shown which pivotally fixes the rear wheel 120 to the three-wheeled vehicle body 110. A wheel guard 130 is shown covering a portion of the rear wheel 120. Unlike FIG. 1, the housing 140 is not shown in order to expose the manner in which the swing arm 100 interfaces with non-driven wheel assembly components. FIG. 1B additionally depicts rear bumper 150. The rear bumper extends from the swing arm at an angle and wraps behind the rear wheel. The rear bumper creates an additional crumple zone in the event of a rear-end collision. In some embodiments, the rear bumper has a C-beam structure, such as that described below for the wheel yoke in FIGS. 15A-17.

FIG. 2 shows a close-up view of the swing arm 100 of FIG. 1B. The swing arm is shown further comprising a third pivotal axis 210 through which a suspension system 220 is pivotally fixed to the swing arm 100. The suspension system 220 is also pivotally fixed on another end to third vehicle frame members 230 by means of a fourth pivotal axis 240.

The swing arm 100 is pivotally fixed to the vehicle frame in a manner shown hereafter, and the suspension system 220 decelerates and dampens the pivotal motion of the swing arm 100 about its pivotal axis. FIG. 2 also shows the same rear wheel 120 and wheel guard 130 as shown in FIG. 1B.

FIGS. 3A-E depict a comparison of various swing arm designs. The depictions show lines representing axes of the frame and wheel yokes to more efficiently aid the description below of the effect a collision has on the respective swing arms. FIG. 3A depicts force 301 on double-arm swing arm 302 and a corresponding vehicle frame upon a collision with the swing arm in the direction of the force. A significant portion of the force of the collision is transferred directly to the vehicle frame. FIGS. 3B-D depict force 303 on swing arm 304, and torque 305 resulting from force 303. While some crumpling occurs, most of the force of a collision is transferred to the frame in the form of torque, which results in the frame bending, because most of the force of the collision is transferred to only one side of the swing arm. FIG. 3E depicts force 306 on swing arm 307. Because wheel yoke 307a is angled towards frame yoke 307b, torque 308 on the frame by the frame yoke is in the opposite direction as compared with force 303. This distributes the force of a collision more evenly to the frame as compared with other single-arm designs, and reduces the force exerted on the frame as compared with the double-arm design because a significant amount of force is absorbed as the wheel yoke crumples towards the frame yoke.

Figure 4:
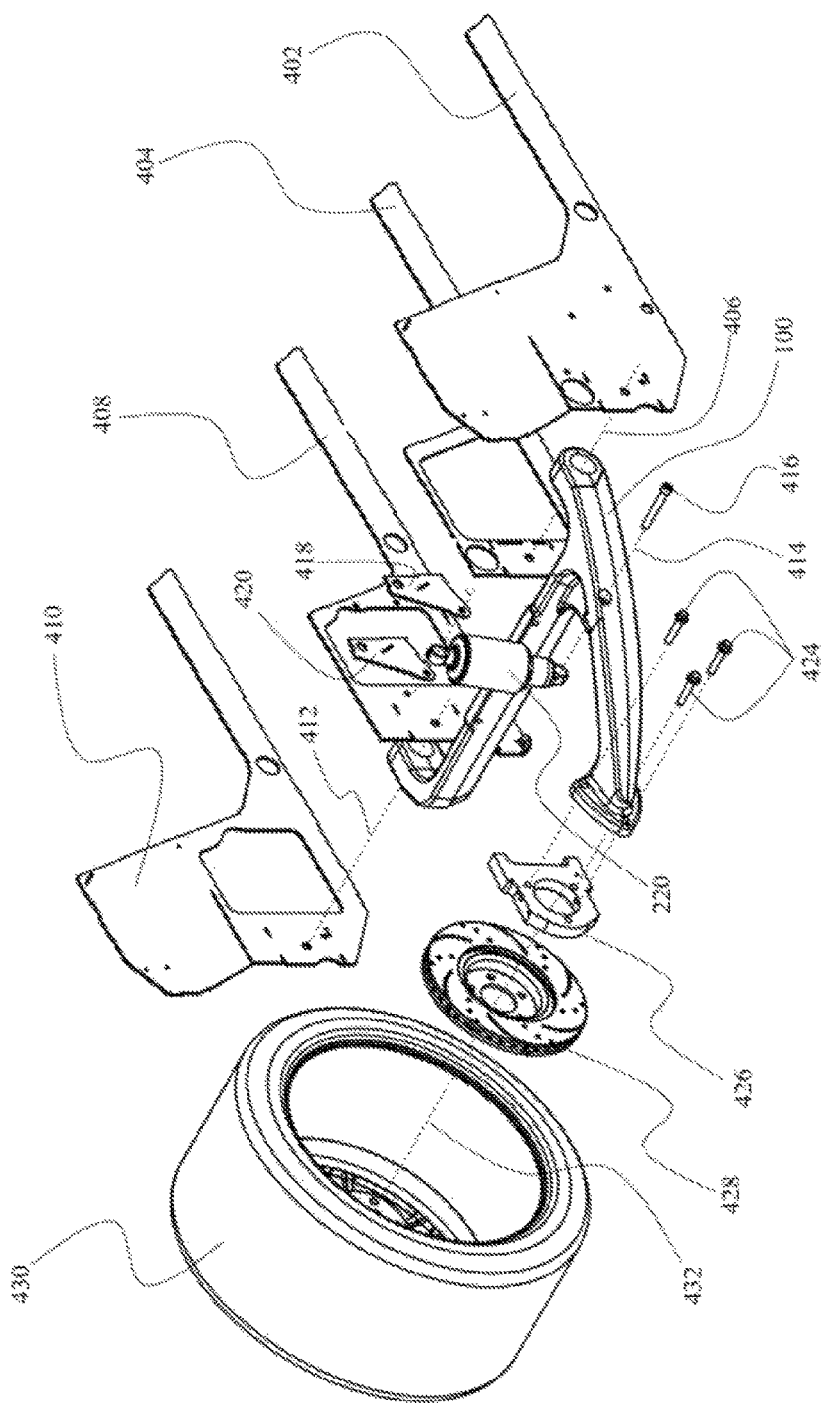
FIG. 4 is an exploded perspective view of a swing arm attached to vehicle frame members, a suspension system, a mounting plate, and wheel assembly components.

FIG. 4 shows a perspective exploded view of the swing arm 100 and other major components with which said swing arm 100 interfaces with. The swing arm 100 is shown having a first pivotal axis 406 and a second pivotal axis 412. The swing arm 100 is pivotally fixed at the first pivotal axis 406 to a first vehicle frame member, the first vehicle frame member being comprised of a first vehicle frame first panel 402 and a first vehicle frame second panel 404. The swing arm 100 is also pivotally fixed at the second pivotal axis 412 to a second vehicle frame member comprised of a second vehicle frame first panel 408 and a second vehicle frame second panel 410. The first vehicle frame first panel 402, the first vehicle frame second panel 404, the second vehicle frame first panel 408, and the second vehicle frame second panel 410 are further comprised of tabs and slots, said tabs fitting into slots of other panels and said slots fitting into the tabs of other panels. These tab and slot panels are then welded together onto the vehicle frame. As such, the first vehicle frame member and the second vehicle frame member are welded onto the remainder of a vehicle frame not shown here, and are understood to be rigidly fixed extensions of the vehicle frame. The suspension system 220 is also shown, the suspension system 220 being pivotally fixed to the swing arm 100 at the third pivotal axis 414, the third pivotal axis further comprising a bolt 416. The suspension system is also pivotally fixed to third vehicle frame members 418, 420 which are understood to be rigidly fixed extensions of the vehicle frame. Also shown are mounting bolts 424 which are used to rigidly fix a mounting plate 426 to the swing arm 100.

The mounting plate 426 is also fixed to a brake disk 428, which is fixed to the wheel 430, the mounting plate 426, brake disk 428, and wheel 430 being fixed coaxially along a wheel axis 432. Other components such as a bearing housing and brake calipers are used in the non-driven wheel assembly but not shown in FIG. 4 because their use is non-novel and commonplace in vehicle wheel assemblies.

Figure 5:
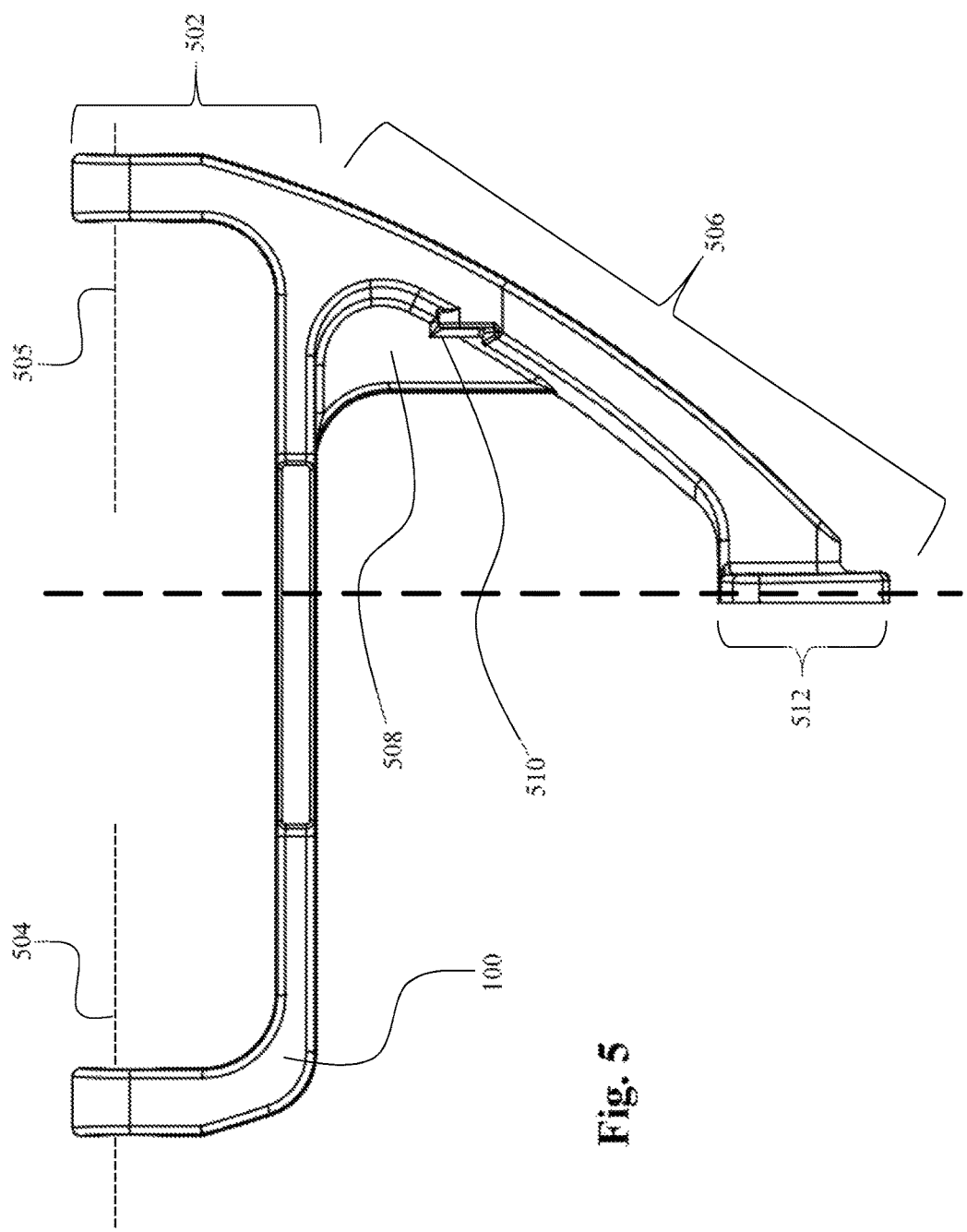
FIG. 5 is a top-down view of a swing arm.

FIG. 5 shows a top-down view of the swing arm 100. The swing arm further comprises a yoke portion 502 and an arm portion 506. The yoke portion is shown to be U-shaped and further comprises a first pivotal axis 505 and a second pivotal axis 504 which are also shown to be coaxial. The arm portion 506 is shown to further comprise a suspension system interface 510, which changes the geometry of the arm portion to allow a suspension system to be pivotally fixed to the arm portion 506 along a pivotal axis parallel to the first pivotal axis 505 and the second pivotal axis 504. The arm portion 506 is also shown to further comprise a rib 508 between at least a portion of the arm portion 506 and a portion of the yoke portion 502.

Figure 6:
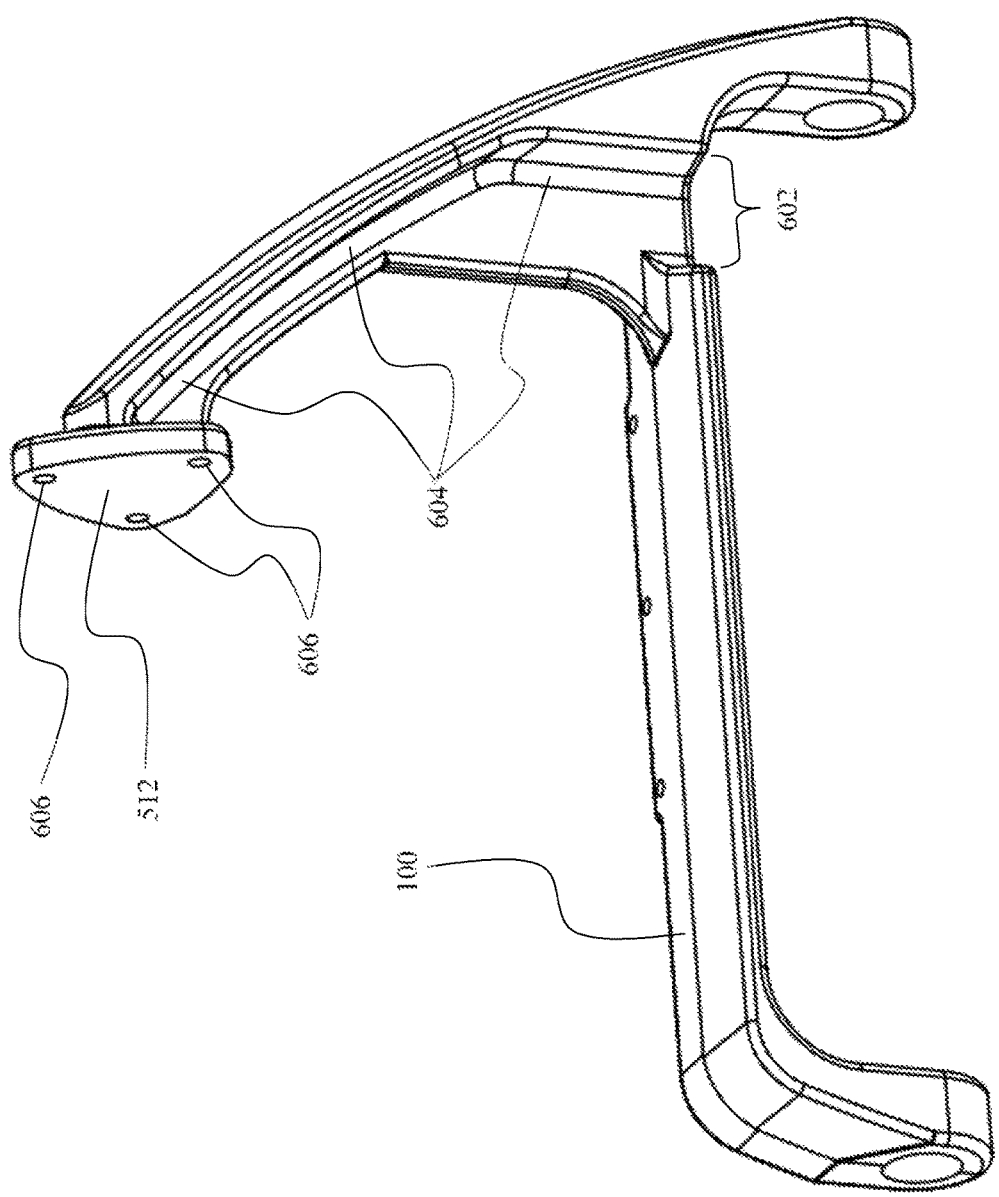
FIG. 6 is a perspective view of the underside of one embodiment of a swing arm.

FIG. 6 shows a perspective view of the underside of the swing arm 100. On the underside, the swing arm 100 further comprises a trough 604, said trough 604 comprising a trough opening 602 in the yoke portion of the swing arm 100. This trough 604 allows the passage of components, especially lines, tubes, and/or wires, between the vehicle body and the non-driven wheel assembly affixed to the swing arm 100. The manner in which said components pass through and are fixed to the swing arm 100 will be shown hereafter in FIGS. 7, 12, 13, and 14A-C. The orthogonal interface 512 is also shown, along with fifth openings 606 through the orthogonal interface 512 which are used to rigidly fix the swing arm 100 to a mounting plate.

Figure 7:
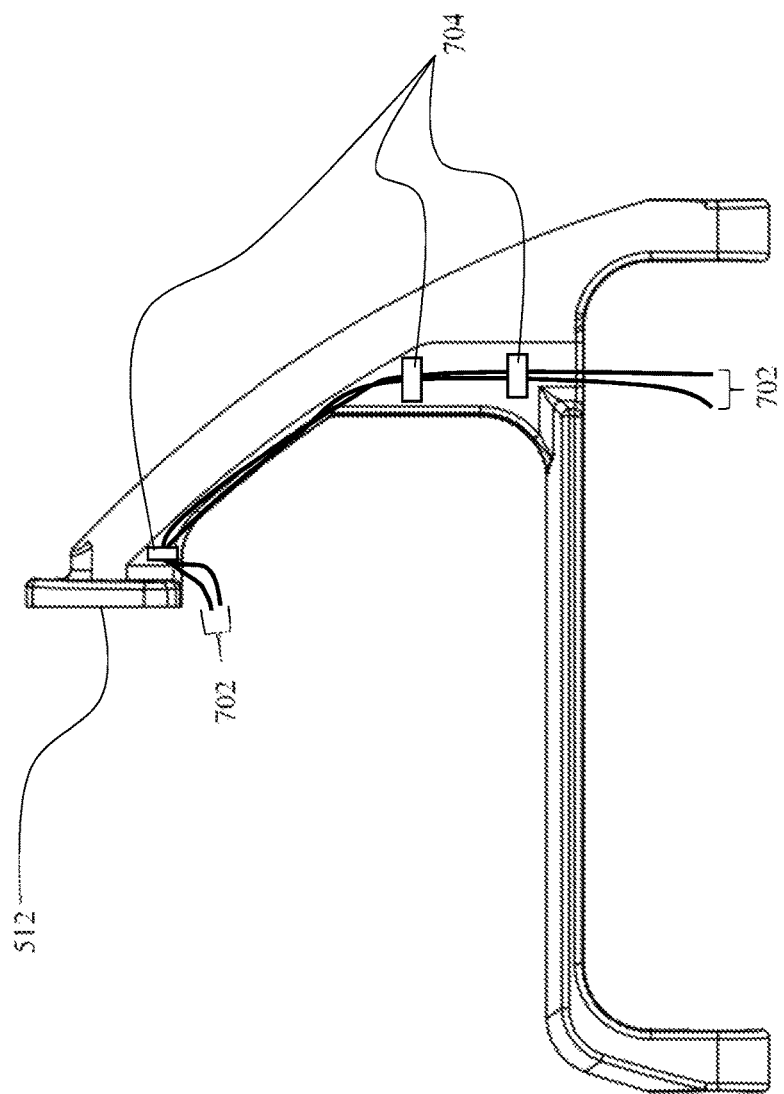
FIG. 7 is a bottom view of a swing arm showing the passage of wheel assembly components along a trough in the swing arm.

FIG. 7 shows a bottom view of the swing arm with non-driven wheel assembly components 702. The non-driven wheel assembly components 702 are fixed to the underside of the swing arm using fasteners 704 which guide said non-driven wheel assembly components 702 and prevent them from extending beyond the profile of the swing arm. The non-driven wheel assembly components pass through the trough opening and through the trough on the underside of the swing arm (the trough opening and the trough are shown in FIG. 6). Near the orthogonal interface of the arm portion of the swing arm, the non-driven wheel assembly components 702 leave the passage and are fixed to the non-driven wheel assembly.

Figure 8:
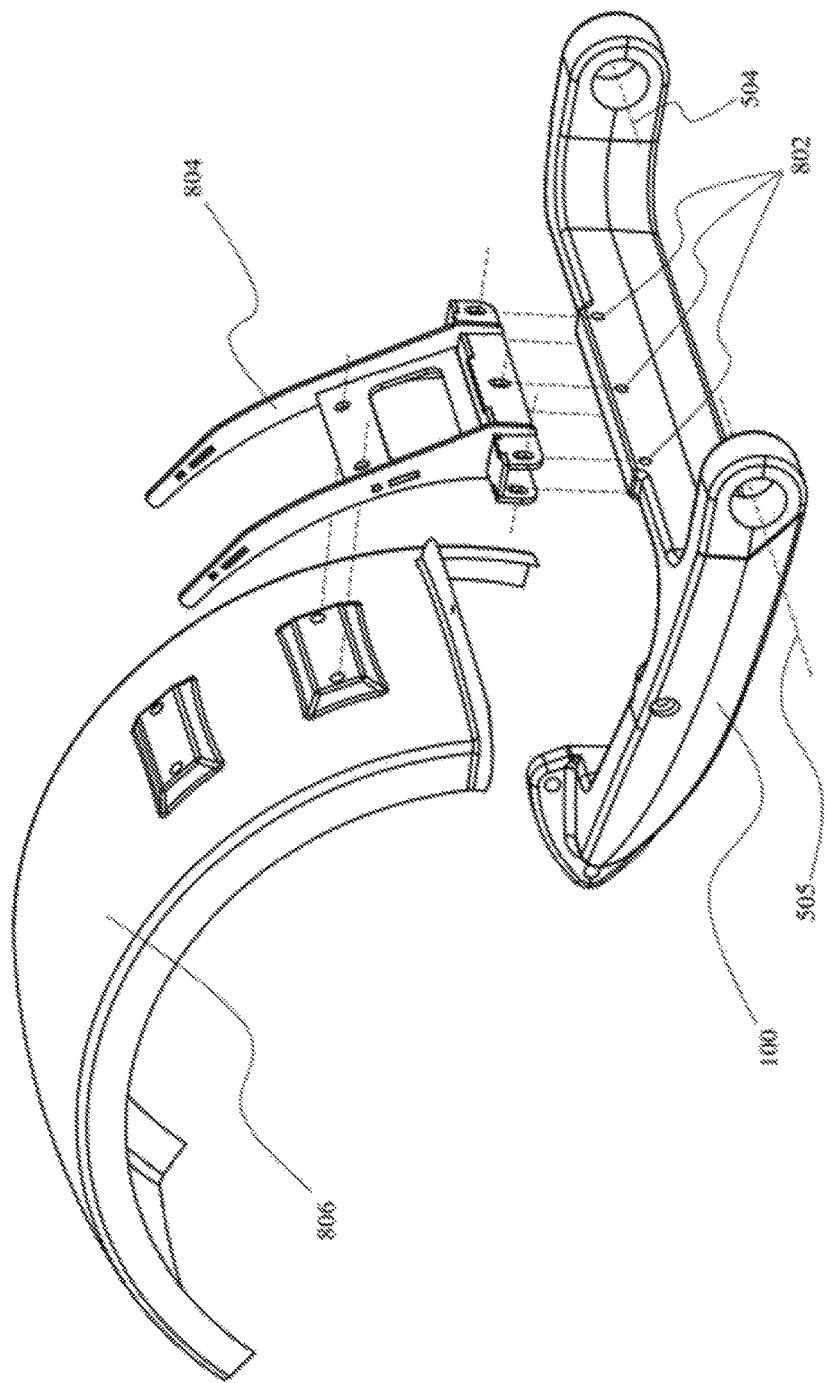
FIG. 8 is a perspective exploded view of a swing arm, fender assembly, and wheel guard.

FIG. 8 shows a perspective exploded view of the swing arm 100, a fender assembly 804, and a wheel guard 806. The yoke portion of the swing arm 100 is shown to further comprise a first pivotal axis 505 and a second pivotal axis 504, the first pivotal axis 505 and the second pivotal axis 504 being coaxial. The yoke portion of the swing arm 100 is shown to further comprise fourth openings 802 through which the fender assembly 804 is rigidly fixed to the swing arm 100. The fender assembly 804 is further comprised of tab and slot panels which are fitted and welded together. The wheel guard 806 is also shown to be rigidly fixed to the fender assembly 804.

Figure 9:
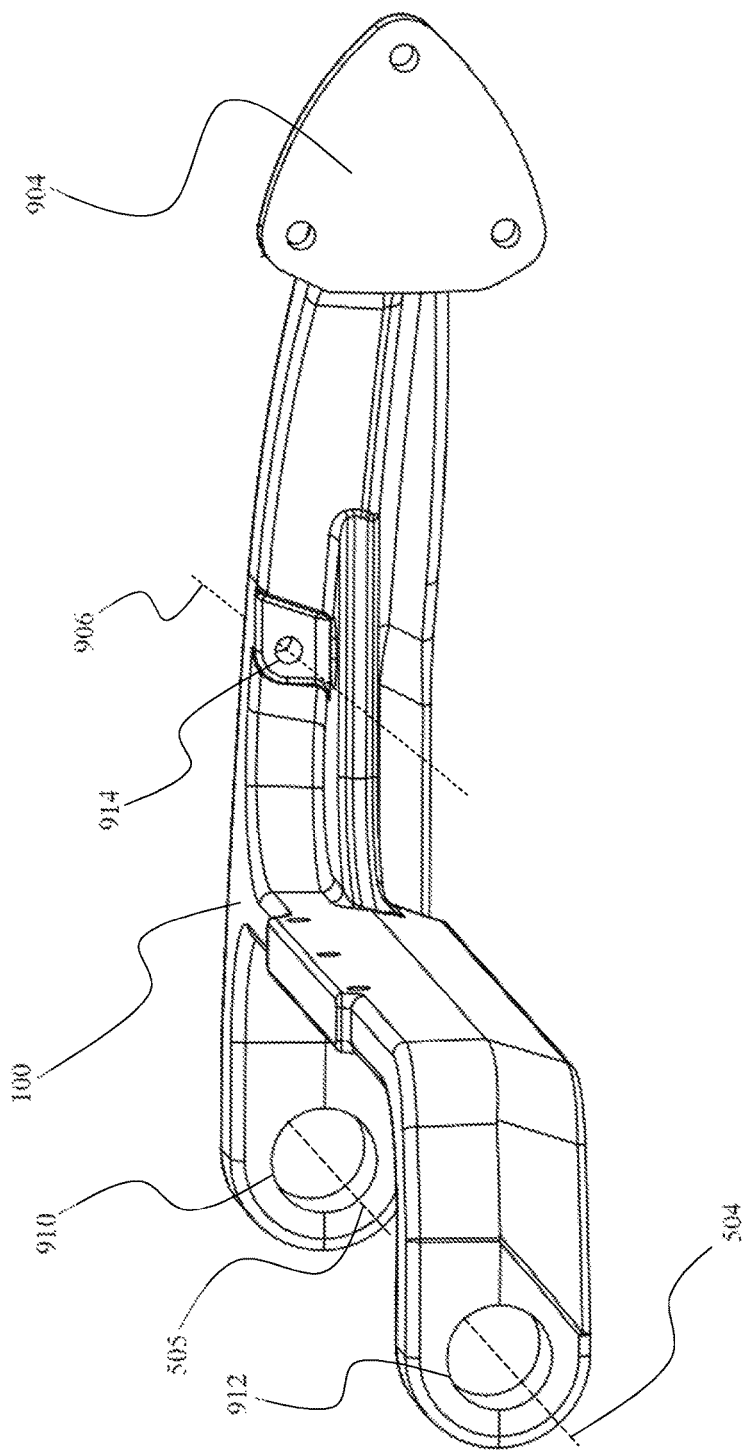
FIG. 9 is a perspective view of a swing arm with a triangular orthogonal interface.

FIG. 9 shows a perspective view of the swing arm 100. The swing arm 100 is shown to comprise a first pivotal axis 505 and a second pivotal axis 504. Furthermore, the first pivotal axis 505 is shown to comprise a first opening 910 and the second pivotal axis 504 is shown to comprise a second opening 912. The swing arm 100 is also shown to comprise a third pivotal axis 906 which comprises a third opening 914 through which a suspension system is pivotally fixed to the arm portion of the swing arm. The orthogonal interface 904 is shown to have a generally triangular shape with rounded corners, said orthogonal interface 904 further comprising fifth openings at each rounded corner of the generally triangular shape.

Figure 10:
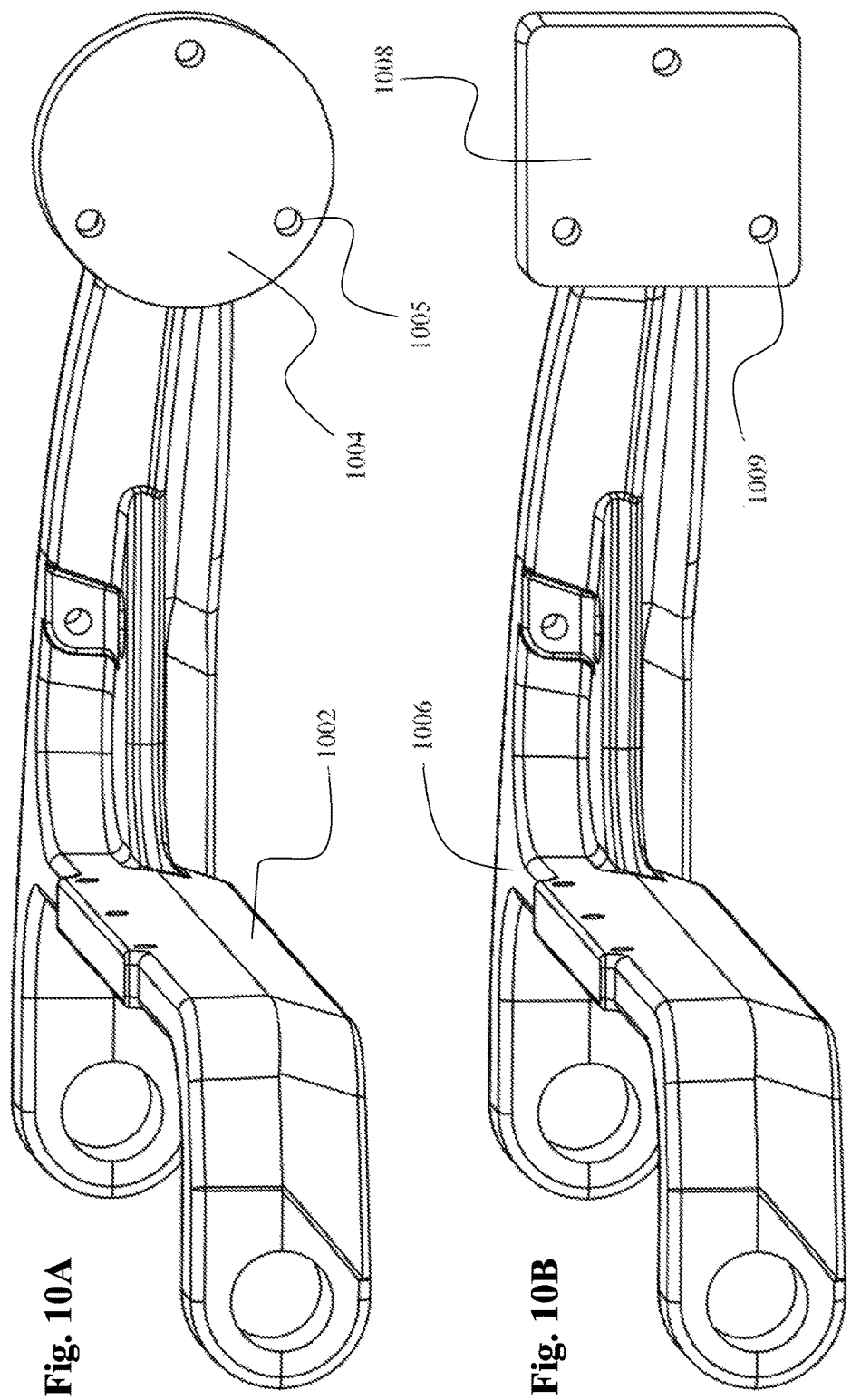
FIGS. 10A-B show perspective views of swing arms with circular and square orthogonal interfaces.

FIGS. 10A-B show two additional embodiments of the swing arm, each having an orthogonal interface with a different shape. FIG. 10A shows a swing arm 1002 comprising an orthogonal interface 1004 with a circular shape. The circular shape provides a structural advantage which enables fifth openings 1005 in the orthogonal interface 1004 to withstand increased loads. FIG. 10B shows a swing arm 1006 comprising an orthogonal interface 1008 with a square shape, the corners of the square being rounded. The entire swing arm 1006 is manufactured by casting and then by machining the orthogonal interface 1008 and all openings on said swing arm 1006. The advantage of a square shape is that machining processes are simpler due to the ease of machining holes with reference to the distance of two sides of the square to a fifth opening 1009 in the orthogonal interface 1008. Thus, machining and quality control costs and time can be reduced.

Figure 11:
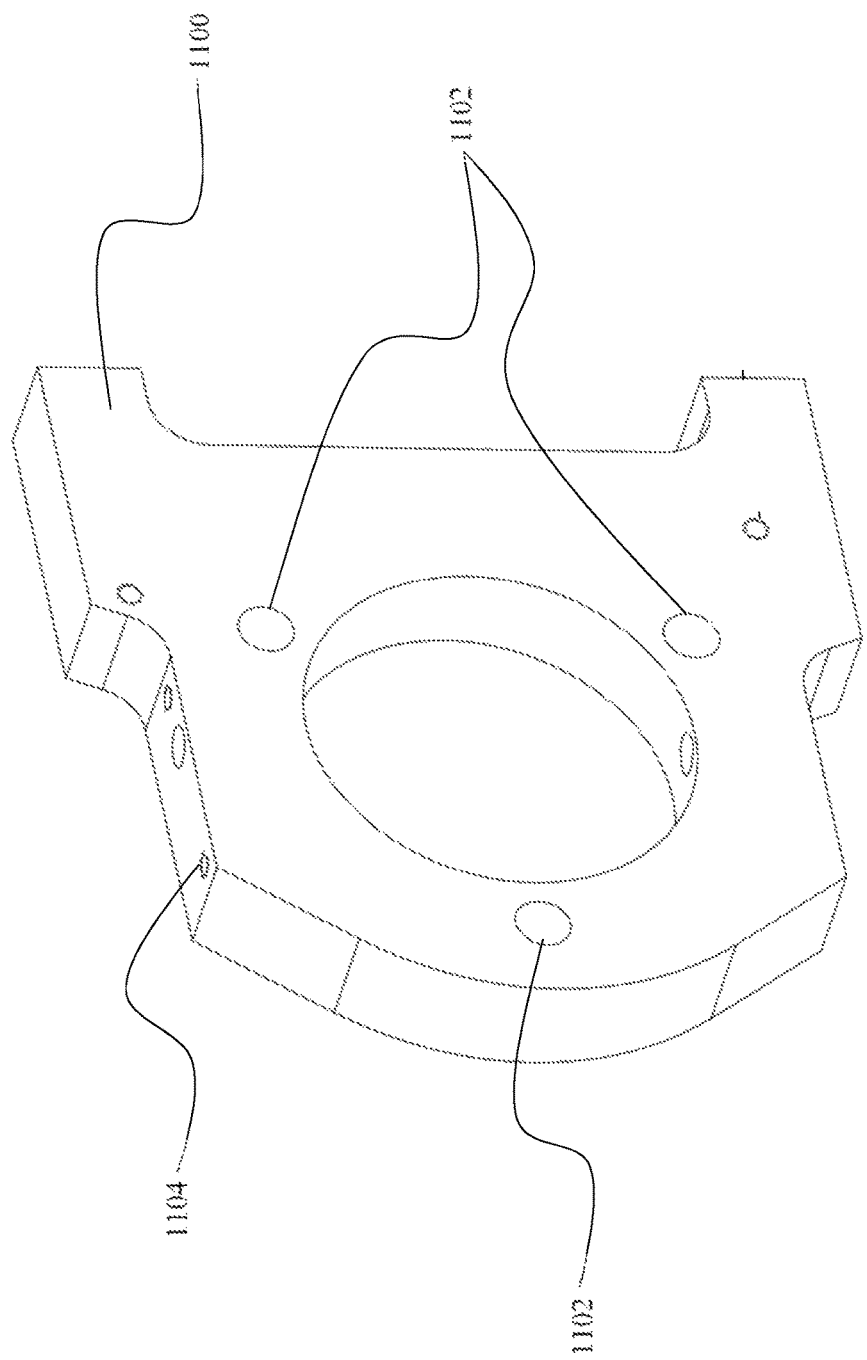
FIG. 11 is a perspective view of a mounting plate.

FIG. 11 shows a perspective view of a mounting plate 1100. The mounting plate 1100 comprises sixth openings 1102 which are used to rigidly fix the mounting plate 1100 to the orthogonal interface of the swing arm. The mounting plate 1100 further comprises housing openings which are used to rigidly fix a housing to the mounting plate as seen in FIG. 1. The mounting plate 1100 is also rigidly fixed to the non-driven wheel assembly, thus acting as an intermediary interface between the orthogonal interface of the swing arm and the non-driven wheel assembly. Although features of the mounting plate 1100 could be incorporated into the orthogonal interface of the swing arm, the use of a separate mounting plate 1100 reduces the complexity of the casting and machining of the swing arm. Thus overall manufacturing costs are reduced by the separate manufacturing of the swing arm and the mounting plate 1100 than the combined manufacturing of the two in one piece.

Figure 12:
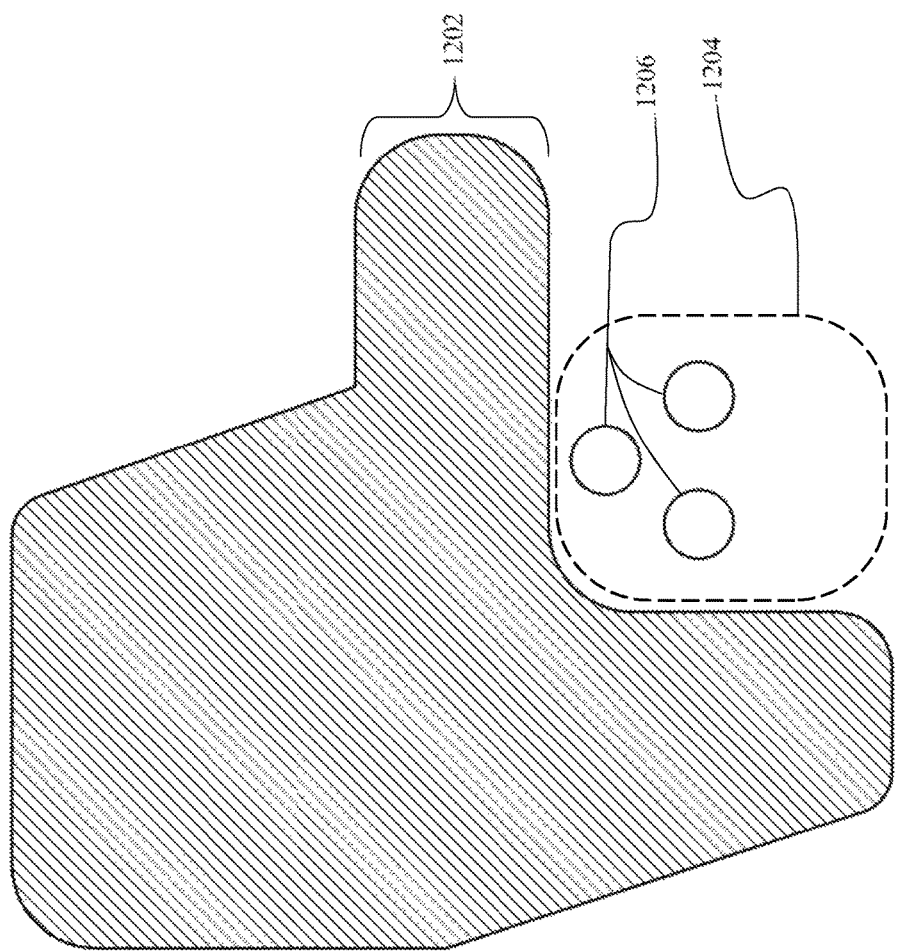
FIG. 12 is a cross-sectional view of the arm portion of a swing arm showing a rectangular trough.

FIG. 12 shows a cross-sectional view of one embodiment of the trough of the swing arm. This view shows that a rib 1202 separates the top and underside of the cross-section of the arm portion of the swing arm. A trough 1204 is shown on the underside of the swing arm having a generally rectangular shape. The trough 1204 makes space on the underside of the swing arm through which non-driven wheel assembly components 1206 (such as brake lines and sensor wires) can be passed. The non-driven wheel assembly components 1206 are secured to the swing arm in a manner detailed in FIG. 7. In addition, the trough 1204 protects the non-driven wheel assembly components 1206 from debris due to the trough 1204 location underneath the rib 1202.

Figure 13:
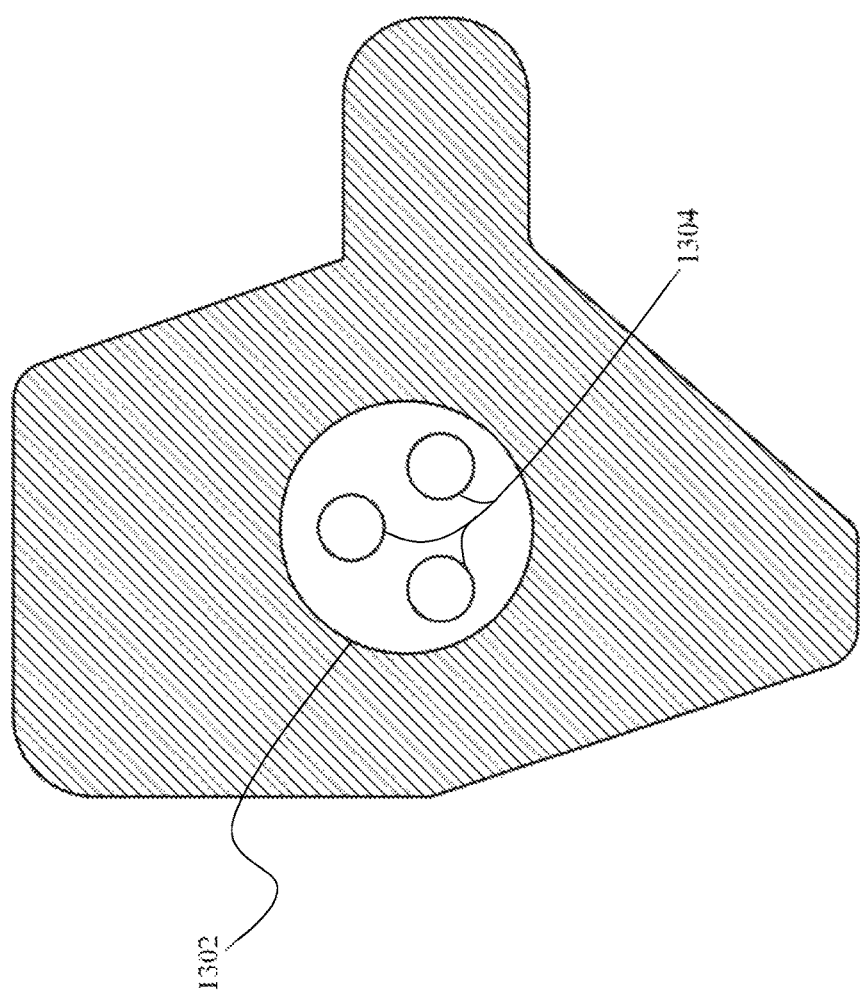
FIG. 13 is a cross-sectional view of the arm portion of a swing arm showing an enclosed circular trough.

FIG. 13 shows a cross-sectional view of another embodiment of the trough of the swing arm. This view shows a trough 1302 which is circular in cross-sectional shape and through which non-driven wheel assembly components 1304 are passed. The trough 1302 is fully enclosed by the swing arm. This embodiment of the trough 1302 has the advantage of fully protecting the non-driven wheel assembly components 1304 on all sides throughout the length of the swing arm. In addition, non-driven wheel assembly components 1304 need a minimal quantity of fasteners or other fixtures to be secured onto the swing arm, since the shape and location of the trough 1302 will keep the non-driven wheel assembly components 1304 somewhat secure by gravity alone.

Figure 14A:
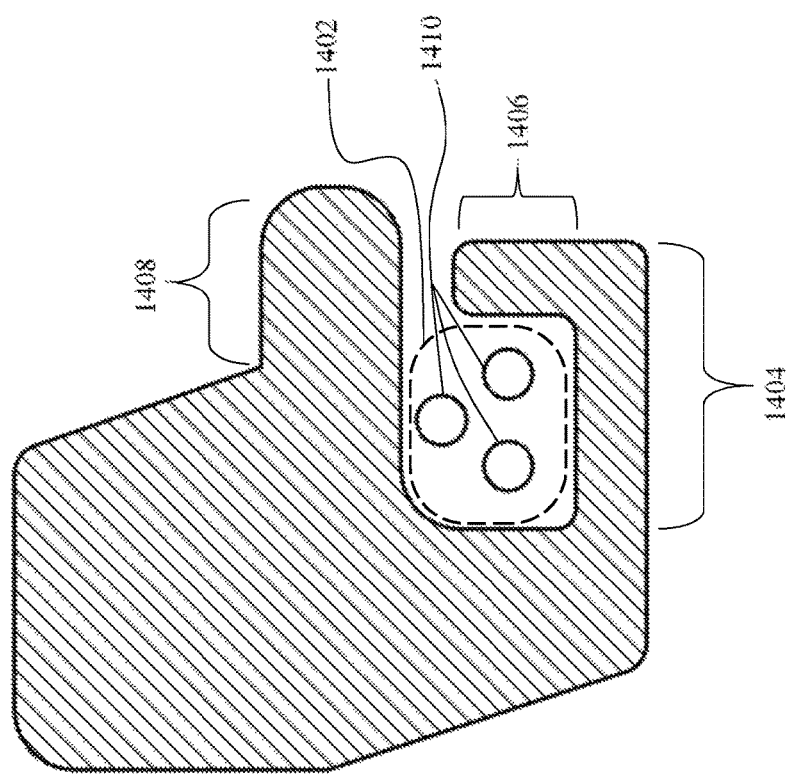
FIGS. 14A-C are cross-sectional views of the arm portion of different embodiments of the swing arm showing a rectangular, circular, and trapezoidal trough respectively.
Figure 14C:
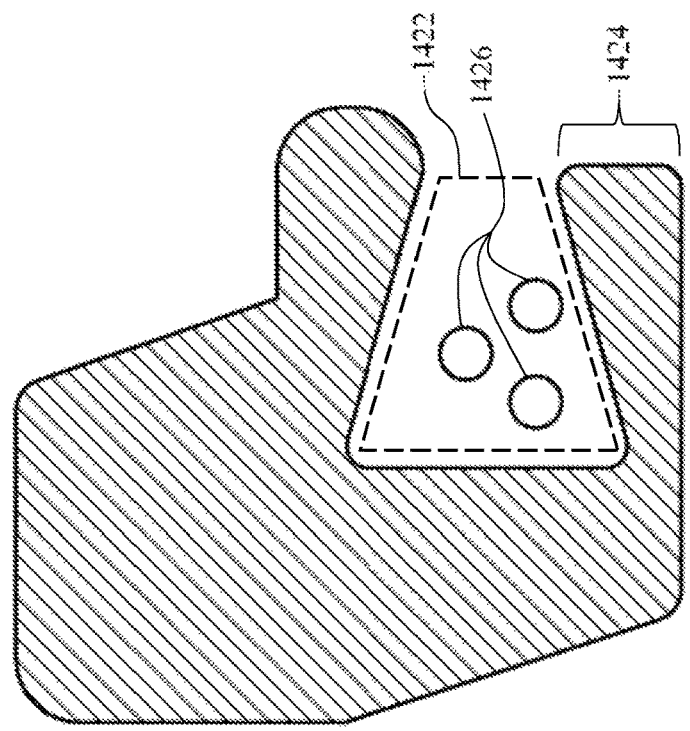
Figure 14B:
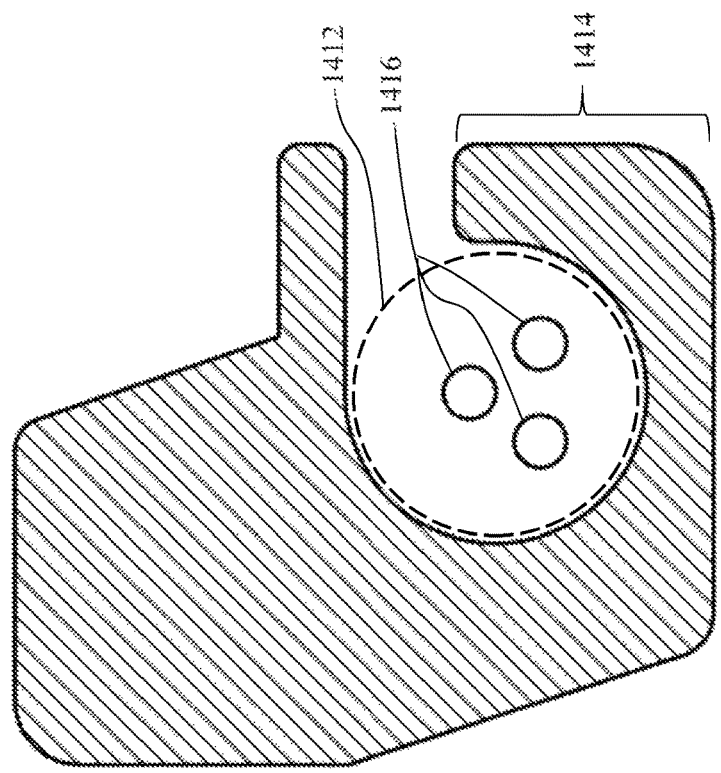

FIGS. 14A-C show cross-sectional views of three additional embodiments of the trough of the swing arm. FIG. 14A shows a trough 1402 which is generally rectangular in cross-sectional shape, the trough 1402 further comprising a retaining wall 1404 and a retaining lip 1406. The trough 1402 is located on the underside of the swing arm under the rib 1408. Non-driven wheel assembly components 1410 are inserted into the trough 1402 through the gap between the rib 1408 and the retaining lip 1406. The non-driven wheel assembly components 1410 rest on the retaining wall 1404 while the retaining lip 1406 prevents the non-driven wheel assembly components 1410 from being dislodged from the trough by forces inherent in vehicle movement. This embodiment has the advantage of protecting non-driven wheel assembly components 1410 from debris while also allowing easy access to said non-driven wheel assembly components 1410 for maintenance or replacement. In addition, because non-driven wheel assembly components 1410 can rest against the retaining wall 1404 due to gravity, fewer fasteners or fixtures are required to secure said non-driven wheel assembly components 1410. FIG. 14B shows a trough 1412 which is generally circular in cross-sectional shape, the trough 1412 further comprising a retaining lip 1414. Non-driven wheel assembly components 1416 are inserted into the trough in a similar manner to the embodiment of the trough shown in FIG. 14A. FIG. 14C shows a trough 1422 which is generally trapezoidal in cross-sectional shape, the trough 1422 further comprising a retaining lip 1424. Non-driven wheel assembly components 1426 are inserted into the trough in a similar manner to the embodiment of the trough shown in FIG. 14A.

In the drawings and associated description, several geometries of orthogonal interfaces and several geometries of troughs for the swing arm have been shown. These geometries have been presented by way of example and not limitation. Other geometries may also be used to increase manufacturability or swing arm strength. Thus, other geometries are possible within the scope of the present invention.

The apparatuses disclosed herein may be embodied in other specific forms without departing from their spirit or essential characteristics. The described embodiments are to be considered in all respects only illustrative and not restrictive. The scope of the invention is, therefore, indicated by the appended claims rather than by the foregoing description. All changes which come within the meaning and range of equivalency of the claims are to be embraced within their scope.

Figure 15A:
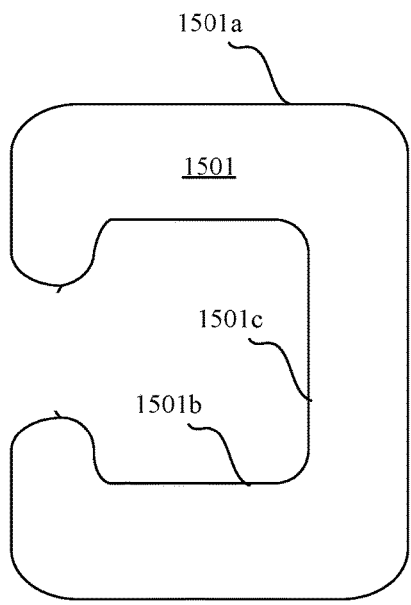
FIGS. 15A-C depict section views of various shapes of a wheel yoke according to the claimed invention.
Figure 15B:
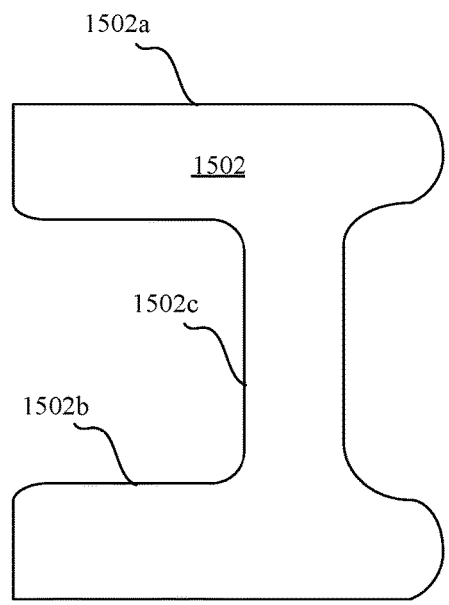
Figure 15C:
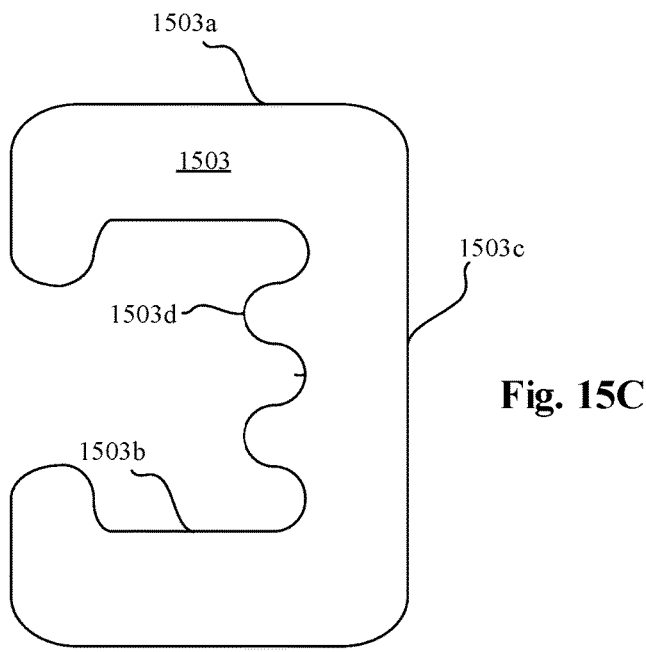

FIGS. 15A-C depict section views of various shapes of a wheel yoke according to the claimed invention. FIG. 15A depicts C-beam structure 1501 having top flange 1501*a*, bottom flange 1501*b*, and web 1501*c*. The top and bottom flanges include cuffs 1501*d* that increase collision energy absorbed as the wheel yoke crumples. FIG. 15B depicts C-beam structure 1502 having top flange 1502*a*, bottom flange 1502*b*, and web 1502*c*. The top and bottom flanges in FIG. 15B extend away from both sides of the web, somewhat similar to an I-beam structure, thereby increasing the vertical flexural strength of the wheel yoke. FIG. 15C depicts C-beam structure 1503 having top flange 1503*a*, bottom flange 1503*b*, and web 1503*c*. The web has alternating thicknesses 1503*d,e* that increase the amount of energy absorbed in a collision while still allowing the wheel yoke to crumple.

Figure 16A:
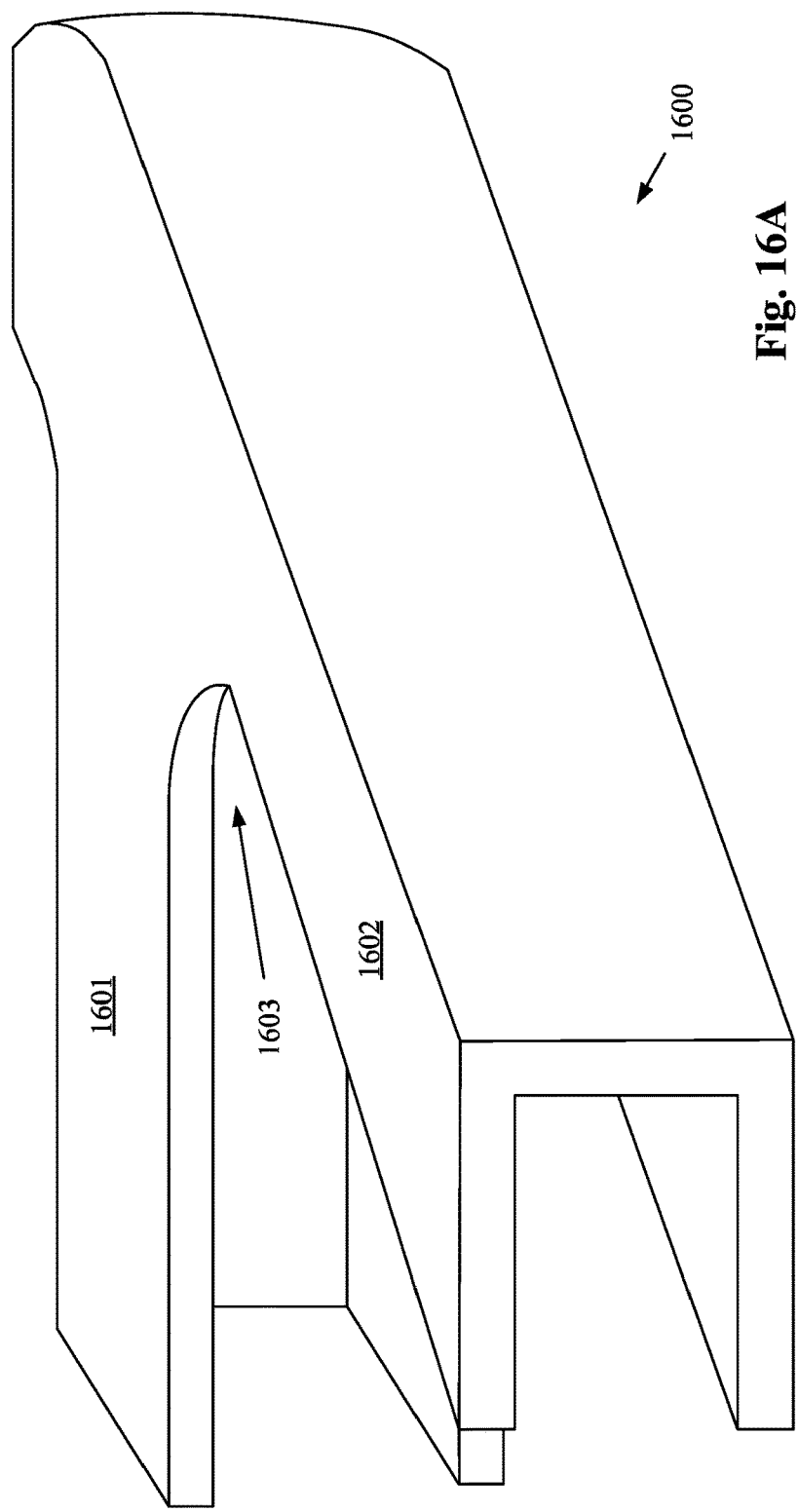
FIGS. 16A-B depict perspective views of various embodiments of an intersection between a frame yoke and a wheel yoke according to the claimed invention.
Figure 16B:
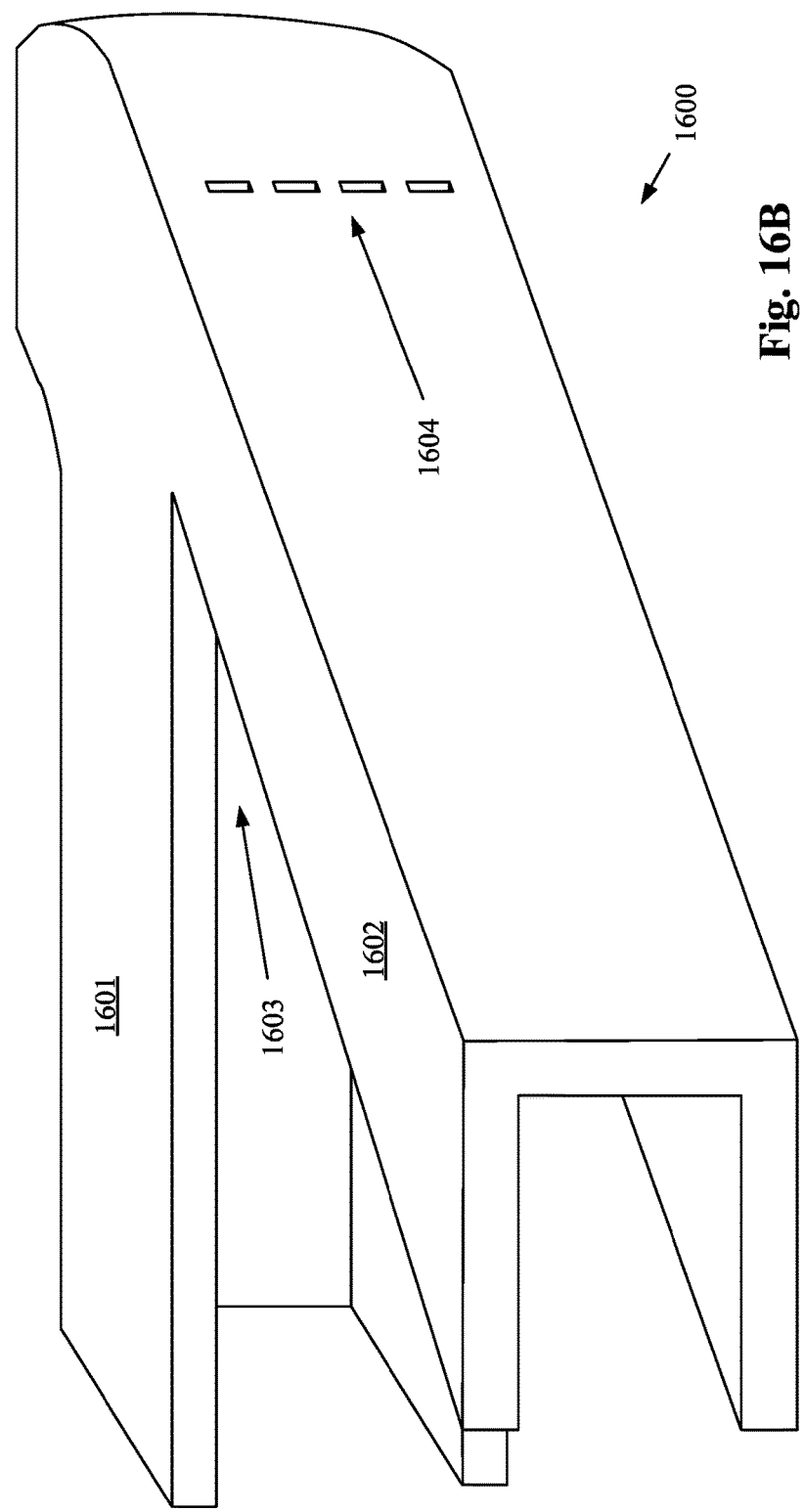

FIGS. 16A-B depict partial perspective views of various embodiments of an intersection between a frame yoke and a wheel yoke according to the claimed invention. Swing arm 1600 includes frame yoke 1601, wheel yoke 1602, and intersection 1603. At the intersection, the frame yoke and the wheel yoke form C-channels that merge at the intersection. As shown in FIG. 16A, the intersection is curved. As shown in FIG. 16B, the intersection is V-shaped. Additionally, FIG. 16B depicts perforations 1604 in the wheel yoke. While somewhat counter-intuitive, this increases the probability that crumpling of the wheel yoke towards the frame yoke will occur without significantly impacting the vertical flexural strength of the wheel yoke. The perforations are disposed through the wheel yoke adjacent to the intersection to increase the amount of toque experience by the wheel yoke at the perforations in a collision.

Figure 17:
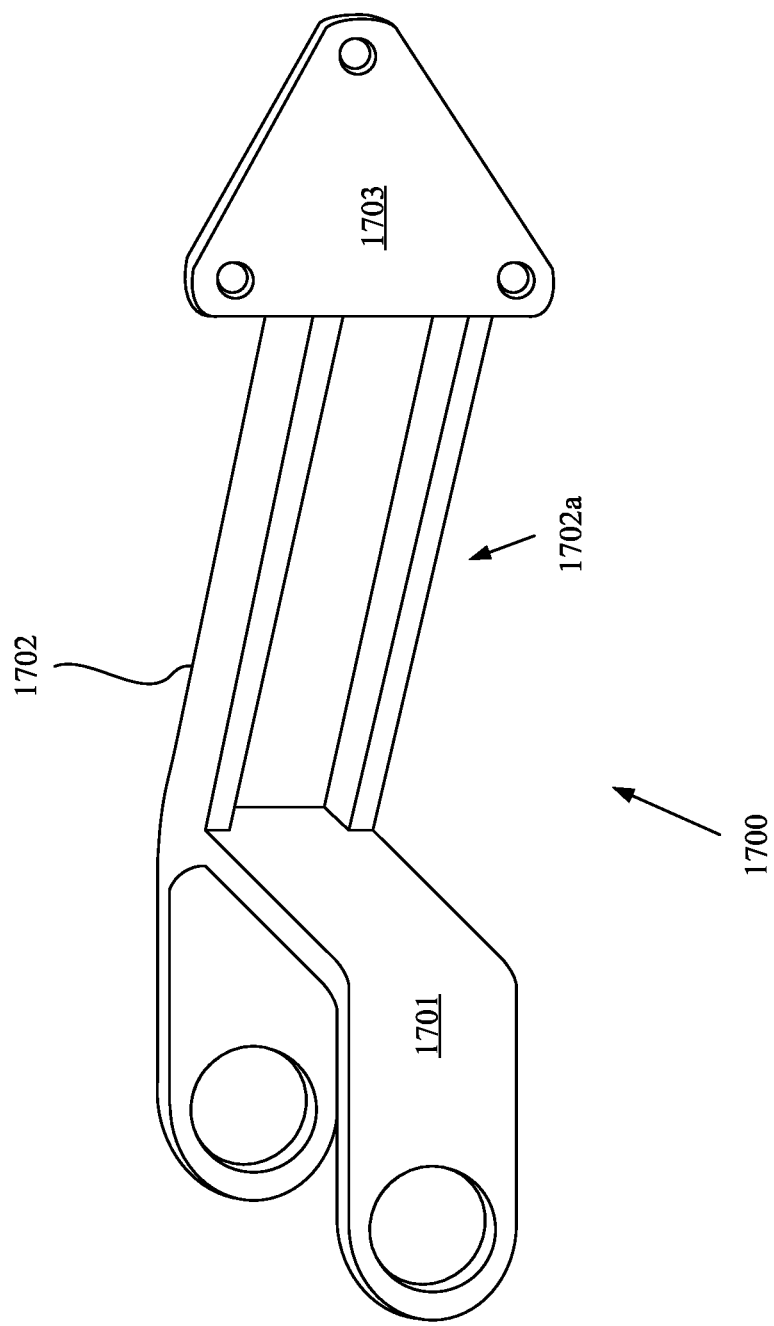
FIG. 17 depicts a perspective view of a swing arm according to the claimed invention.

FIG. 17 depicts a perspective view of a swing arm according to the claimed invention. Swing arm 1700 includes frame yoke 1701, wheel yoke 1702, and orthogonal wheel interface 1703, and is similar to those swing arm embodiments described above. However, in the present embodiment, C-beam structure 1702*a* extends the entire length of the wheel yoke from the frame yoke to the wheel interface. Additionally, while the C-beam structure is shown facing the direction of a wheel coupled to the swing arm, in some embodiments, the C-beam structure faces outwards away from the wheel. This has the benefit of increasing the amount of force absorbed by the wheel yoke in a collision because the tensile strength of the flanges resisting stretching and/or tearing far exceeds the crumple-resistance of the flanges when faced inwards.

We claim:

1. A three-wheeled vehicle crumple zone, comprising:
   a triangular, single-sided swing arm coupling a wheel to a frame of the vehicle at an end-most portion of the vehicle, wherein the swing arm comprises:
      a u-shaped frame yoke coupling the swing arm to the frame; and
      an angled wheel yoke coupling the wheel to the swing arm, the wheel yoke extending from the frame yoke at an angle ranging from 40 to 70 degrees, such that the frame yoke, the wheel yoke, and a centerline axis extending perpendicularly from the frame yoke form a right triangle,
   wherein the angle is such that a collision force required to reduce the angle is less than a force required to bend the frame where the frame yoke couples to the frame.

2. The three-wheeled vehicle crumple zone of claim 1, wherein the angle ranges from 45 degrees to 65 degrees, 50 degrees to 60 degrees, or wherein the angle is 55 degrees plus or minus one degree.

3. The three-wheeled vehicle crumple zone of claim 1, wherein the frame yoke comprises a base, a first arm coupled to the frame and extending perpendicularly from the base, and a second arm coupled to the frame distally from the first arm and extending perpendicularly from the base at an end of the base opposite the first arm.

4. The three-wheeled vehicle crumple zone of claim 1, wherein the wheel yoke comprises a C-beam structure, including a top flange, a bottom flange, and a web extending from the top flange to the bottom flange, the top and bottom flanges and web extending along a length of the wheel yoke away from the frame yoke.

5. The three-wheeled vehicle crumple zone of claim 4, wherein the frame yoke also comprises a C-beam structure having a top flange, a bottom flange, and a web extending from the frame yoke top flange to the frame yoke bottom flange.

6. The three-wheeled vehicle crumple zone of claim 5, wherein the frame yoke C-beam and the wheel yoke C-beam form an intersection between the frame yoke and the wheel yoke.

7. The three-wheeled vehicle crumple zone of claim 6, wherein the wheel yoke web is perforated along a length extending from the wheel yoke top flange to the wheel yoke bottom flange.

8. The three-wheeled vehicle crumple zone of claim 6, wherein the wheel yoke web comprises a first web thickness and a second web thickness, the first and the second web thickness alternating along a length of the wheel yoke web extending from the wheel yoke top flange to the wheel yoke bottom flange.

9. The three-wheeled vehicle crumple zone of claim 4, wherein the top flange, the bottom flange, and the web extend along an entire length of the wheel yoke.

10. The three-wheeled vehicle crumple zone of claim 1, further comprising a curved flange between the wheel yoke and the frame yoke, the curve of the flange having a radius ranging from one-twentieth a length of the wheel yoke to equal to the length of the wheel yoke.

11. The three-wheeled vehicle crumple zone of claim 1, wherein the angle between the wheel yoke and the frame yoke has a "V" shape.

12. The three-wheeled vehicle crumple zone of claim 1, wherein a force required to reduce the angle between the wheel yoke and the frame yoke is less than a force required to deform the frame at the point where the frame yoke couples to the frame.

13. The three-wheeled vehicle crumple zone of claim 1, the frame yoke comprising:
   a first pivotal axis pivotally fixed to a first frame member of the frame; and
   a second pivotal axis pivotally fixed to a second frame member of the frame, wherein the first and the second pivotal axis are coaxial.

14. The three-wheeled vehicle crumple zone of claim 1, the wheel yoke comprising a pivotal axis pivotally fixed to a suspension system, the suspension system pivotally fixed to the frame.

15. The three-wheeled vehicle crumple zone of claim 1, the wheel yoke comprising an orthogonal interface attached to a mounting plate, the mounting plate attached to a non-driven wheel assembly.

16. The three-wheeled vehicle crumple zone of claim 1, further comprising a trough disposed on an underside of the frame yoke, an underside of the wheel yoke, or both.

17. The three-wheeled vehicle crumple zone of claim 1, further comprising a fender assembly fixed to the frame yoke.

18. The three-wheeled vehicle crumple zone of claim 17, the fender assembly further comprising welded tab and slot panels and a wheel guard.

19. The three-wheeled vehicle crumple zone of claim 1, further comprising a vehicle bumper coupled to the wheel yoke.

20. The three-wheeled vehicle crumple zone of claim 19, wherein the bumper extends from the wheel yoke at an angle equal to the angle formed by the wheel yoke and the frame yoke, and wherein the bumper extends around a portion of the wheel on a side of the wheel opposite the frame yoke.

* * * * *